United States Patent [19]

Ohyama et al.

[11] Patent Number: 4,816,953
[45] Date of Patent: Mar. 28, 1989

[54] TAPE CASSETTE WITH GROOVE ENGAGEABLE WITH LOADING HOOK

[75] Inventors: Masao Ohyama, Tokyo; Yoshinori Yamamoto, Kanagawa; Kenichi Horikawa, Tokyo; Kenji Kawakami, Kanagawa, all of Japan

[73] Assignee: Sony Corporation, Tokyo, Japan

[21] Appl. No.: 203,561

[22] Filed: May 25, 1988

Related U.S. Application Data

[63] Continuation of Ser. No. 23,255, Mar. 9, 1987, abandoned, which is a continuation of Ser. No. 719,432, Apr. 3, 1985, Pat. No. 4,694,360.

[30] Foreign Application Priority Data

Apr. 3, 1984 [JP] Japan .............................. 59-48693[U]
Jun. 5, 1984 [JP] Japan .............................. 59-83087[U]

[51] Int. Cl.$^4$ ............................................ G11B 23/087
[52] U.S. Cl. ............................................................ 360/132
[58] Field of Search ........................... 360/132, 95, 85; 242/198

[56] References Cited

U.S. PATENT DOCUMENTS

| | | | |
|---|---|---|---|
| 3,008,012 | 11/1961 | Proctor | 360/132 |
| 3,826,489 | 7/1974 | Watkins, Jr. | 360/132 |
| 3,900,170 | 8/1975 | Serizawa | 360/132 |
| 4,071,859 | 1/1978 | Sami | 360/96 |
| 4,115,826 | 9/1978 | Takagi et al. | 360/96 |
| 4,173,319 | 11/1979 | Umeda | 242/199 |
| 4,208,681 | 6/1980 | Hatchett | 360/96.6 |
| 4,235,395 | 11/1980 | Wardenaar et al. | 360/132 |
| 4,303,955 | 12/1981 | Kramer et al. | 360/93 |
| 4,320,424 | 3/1982 | Murayama | 360/85 |
| 4,345,283 | 8/1982 | Maryschka | 360/96.6 |
| 4,402,024 | 8/1985 | Kato | 360/96.5 |
| 4,561,031 | 12/1985 | Tanabe | 360/96.5 |
| 4,568,990 | 2/1986 | Ueno et al. | 360/96.5 |

FOREIGN PATENT DOCUMENTS

| | | |
|---|---|---|
| 023744 | 2/1981 | European Pat. Off. . |
| 110586 | 9/1984 | European Pat. Off. . |
| 2637141 | 2/1977 | Fed. Rep. of Germany . |
| 2705906 | 8/1977 | Fed. Rep. of Germany . |
| 3229894 | 3/1983 | Fed. Rep. of Germany . |

Primary Examiner—Robert S. Tupper
Attorney, Agent, or Firm—Lewis H. Eslinger; Donald S. Dowden

[57] ABSTRACT

A tape cassette comprises a cassette housing having an upper section, a lower section, a pair of reel hubs rotatably accommodated therein for winding a magnetic tape therearound, and a front opening through which the tape is engageable with a recording and/or reproducing head. The lower section is formed with a pair of openings for respectively receiving reel shafts for rotating the hubs and thereby driving the tape, and the upper section is formed with a recess. A tape player with which the cassette cooperates is provided with a holder for the cassette, with a loading hook engageable in the recess in the upper cassette section, and with an arrangement of cams and levers for moving the loading hook between an ejection position wherein the tape cassette can be manually inserted partway into or removed from the cassette holder and a loaded position wherein an inserted cassette is fully drawn into the holder, and for moving the holder between an upper position wherein a cassette can be loaded into or ejected from the holder and a lower position wherein a cassette loaded into the holder engages a tape drive.

3 Claims, 4 Drawing Sheets

4,816,953

TAPE CASSETTE WITH GROOVE ENGAGEABLE WITH LOADING HOOK

This is a continuation of application Ser. No. 023,255, filed Mar. 9, 1987, now abandoned, which is a continuation of application Ser. No. 719,432, filed Apr. 3, 1985, now U.S. Pat. No. 4,694,360.

BACKGROUND OF THE INVENTION

1. Field of the Invention

This invention relates to a tape cassette for accommodating therein a magnetic tape on which a digital or analog signal containing audio or video information or the like is recorded, or from which such a signal is reproduced. More particularly, the invention relates to a novel and highly-effective tape cassette adapted to be automatically loaded into magnetic recording and/or reproducing apparatus when the tape cassette is properly inserted into a cassette holder therein, and to the apparatus for effecting the automatic loading.

2. Description of the Prior Art

In prior-art magnetic recording and/or reproducing apparatus adapted for use with a Philips type compact cassette, insertion of the tape cassette a predetermined distance into a cassette holder contained within the apparatus turns on a loading switch so that a loading arm is engaged in a reel shaft insertion aperture formed in an upper section of the tape cassette and is moved so as to draw the tape cassette fully into the cassette holder. Then the cassette holder is lowered with the tape cassette therein, and a reel shaft for driving the tape is inserted into a reel shaft insertion aperture formed in a lower section of the tape cassette. The tape cassette is thus brought to a tape drive position wherein a recording and/or reproducing operation is performed.

In the case of a compact cassette of Philips type in which the upper and the lower cassette sections are both provided with reel shaft insertion apertures, such an arrangement is operative, even though not ideal. When a tape cassette in which a reel shaft insertion aperture is formed only in the lower section is inserted into the cassette holder of apparatus having the conventional cassette loading mechanism described above, the arrangement becomes inoperative: The loading arm can not properly engage the tape cassette and hence the tape cassette can not be properly loaded, since the upper section of the tape cassette is provided with no reel shaft insertion aperture.

OBJECTS AND SUMMARY OF THE INVENTION

An object of the invention is to provide a tape cassette of simple construction that is easily, reliably and efficiently loaded into magnetic recording and/or reproducing apparatus.

Another object of the invention is to provide a tape cassette in which an engagement portion engageable with a cassette loading mechanism is formed on a side of the tape cassette opposite the side thereof in which one or more reel shaft insertion aperture are formed, thereby to facilitate cassette loading.

Another object of the invention is to provide a tape cassette having an engagement portion engageable with a cassette loading mechanism so constructed as to be easily disengaged from the cassette loading mechanism and which entails no major modification of the outside dimensions or configuration of the cassette housing.

Another object of the invention is to provide a tape cassette in which an engagement portion engageable with a cassette loading mechanism is formed near the front of the cassette housing so that a tape cassette inserted a short distance into a cassette holder can be engaged by the cassette automatic loading mechanism.

Another object of the invention is to provide recording and/or reproducing apparatus (tape player) having a cassette loading mechanism that is reliably and efficiently engaged with and disengaged from a tape cassette constructed in accordance with the invention.

Another object of the invention is to provide recording and/or reproducing apparatus having a simple, miniature cassette loading mechanism engageable with a portion of the tape cassette which in the left-to-right direction thereof is substantially central, thereby affording reliable cassette loading without the provision of a plurality of loading means, decelerating mechanisms, levers and the like at right and left sides of the cassette holder.

According to one aspect of the present invention, a tape cassette is provided comprising: a cassette housing having an upper section and a lower section; at least one reel hub for winding therearound a magnetic tape, the hub being rotatably accommodated in the cassette housing; the lower section being formed with at least one opening for receiving a reel shaft for rotating the hub and thereby driving the tape; the housing being formed with a front opening through which the tape is engageable with a recording and/or reproducing head; and the upper section being formed with a contoured engagement portion engageable with loading means formed on recording and/or reproducing apparatus when the cassette housing is loaded into the apparatus, whereby the loading means can move the cassette housing within the apparatus.

According to an independent aspect of the present invention, recording and/or reproducing apparatus is provided comprising: a cassette holder; loading means engageable with an engagement portion formed on an upper surface of a tape cassette inserted into the holder; means for moving the loading means between an ejection position wherein a tape cassette can be manually inserted partway into or removed from the holder and a loaded position wherein an inserted cassette is fully drawn into the holder; and means for moving the holder between a load/eject position wherein a cassette can be loaded into or ejected from the holder and a tape drive position wherein a cassette loaded into the holder engages tape drive means, whereby a recording and/or reproducing operation can be performed.

BRIEF DESCRIPTION OF THE DRAWINGS

A better understanding of the objects, features and advantages of the invention can be gained from the following detailed description of the preferred embodiments of the invention, in conjunction with the appended figures of the drawings, wherein.

DESCRIPTION OF THE PREFERRED EMBODIMENTS

Figure 1:
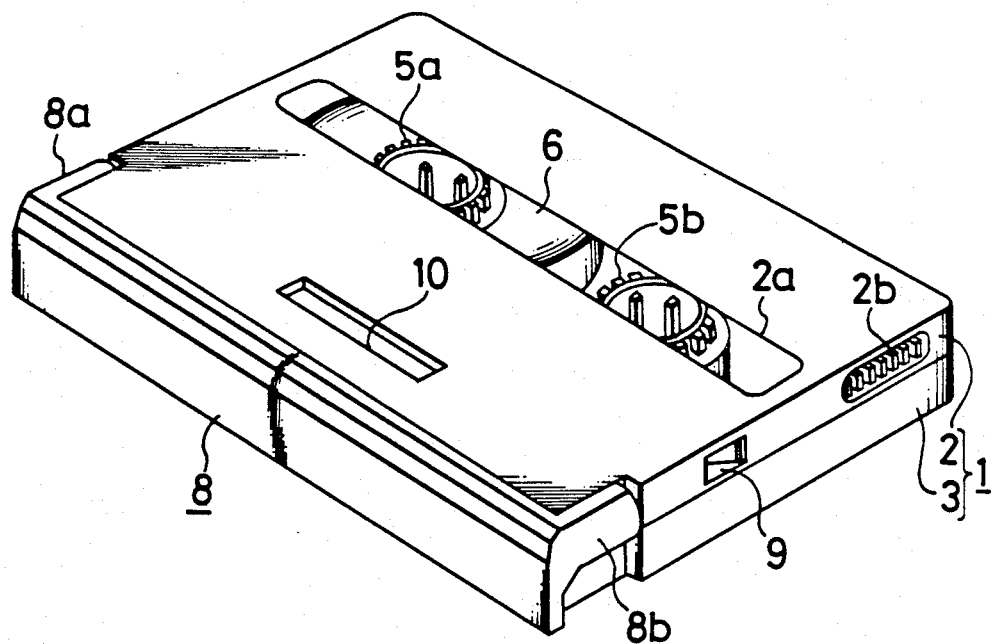
FIG. 1 is a perspective view from above of a preferred embodiment of a tape cassette in accordance with the invention, the cassette being shown in a closed condition.
Figure 2:
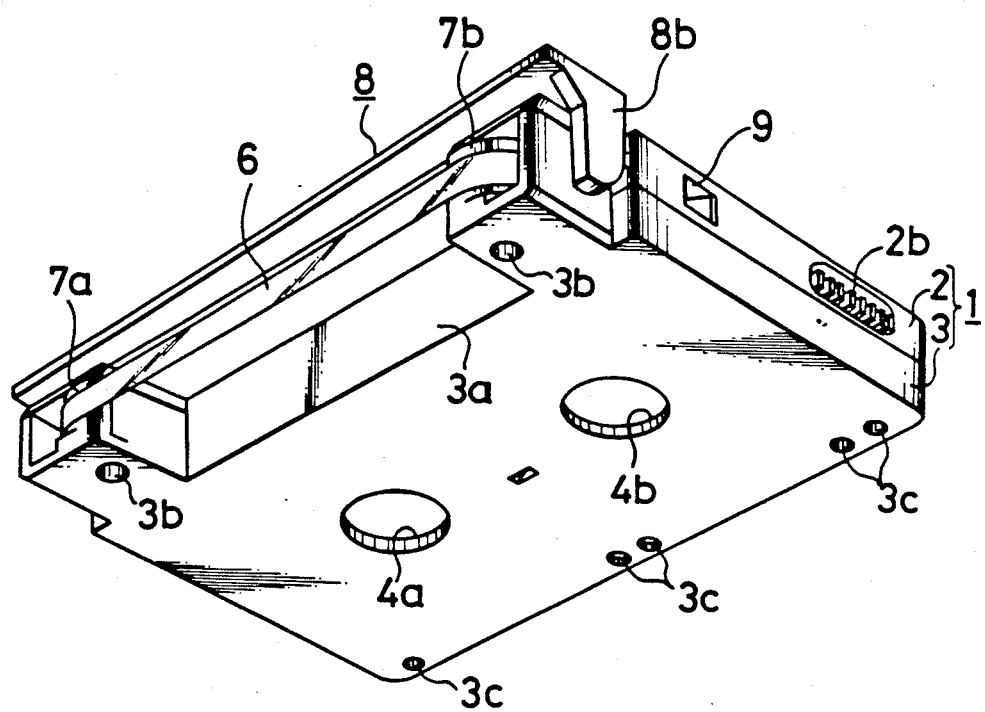
FIG. 2 is a perspective view from below of the tape cassette of FIG. 1 in an open condition.

FIGS. 1 and 2 show a cassette housing 1 comprising an upper sections 2 and a lower section 3 which are fastened together by an conventional fastening means such as screws (not illustrated). An elongated, substantially rectangular, transparent window plate 2a is formed on the upper surface of the upper section 2. A pair of reel shaft insertion apertures 4a and 4b are respectively formed in the lower surface of the lower section 3, and a pair of reel hubs 5a and 5b are located in the cassette housing 1 and rotatably engaged in the pair of reel shaft insertion apertures 4a and 4b. Opposite ends of a magnetic tape 6 are wound around the pair of reel hubs 5a and 5b. As is well known, in the case of an endless tape, it is sufficient that tape cassette have one reel hub and one reel shaft insertion aperture.

The tape 6 is stretched between tape guide columns 7a and 7b that are respectively located near left and right side walls of the cassette housing 1. The tape 6 includes a tape run extending between the tape guide columns 7a and 7b and in parallel, facing relation to the front portion of the cassette housing 1, so that the tape 6 can move along a predetermined path near the front of the cassette housing 1. An elongated cutout 3a of substantially rectangular shape is formed by cutting away the lower section 3 in a predetermined area behind the magnetic tape 6. During recording or reproducing, a tape pulling guide assembly (not shown) of a recording and/or reproducing apparatus is inserted into the cutout 3a.

A front lid 8 is pivotably supported by a pair of arms 8a and 8b respectively positioned at opposite, left and right sides of the cassette housing 1. The front lid 8 is pivotable by means of the arms 8a and 8b between the open position of FIG. 2 and the closed position of FIG. 1. When the front portion of the cassette housing 1 is opened by pivoting the lid 8 to the position thereof shown in FIG. 2, recording or reproducing can be carried out on or from the magnetic tape 6. When, on the other hand, the front portion of the cassette housing 1 is closed by pivoting the lid 8 to the position thereof shown in FIG. 1, the magnetic tape 6 is sealed off from the outside and protected from being touched by fingers and the like.

A pair of concave support portions 9 are respectively formed at intermediate positions of the left and right side walls of the cassette housing 1. When the tape cassette 1 is loaded into the recording and/or reproducing apparatus, the concave support portions 9 are respectively held by left and right support nail members (not shown) of the recording and/or reproducing apparatus. A pair of apertures 3b are formed in the lower section 3 so as to accept pins for positioning the tape cassette. Detecting apertures 3c are similarly formed in the lower section 3, facilitating detection of the length and kinds of the magnetic tape 6 employed, prevention of unintentional erasure, etc. An anti-skid grip 2b is formed near the rear of the side wall of the upper section 2.

In the embodiment of the tape cassette shown in FIG. 1, a rectangular, contoured engagement portion 10 is formed on the upper surface of the upper section 2 of the cassette housing 1. The contoured engagement portion 10 is formed at a position that is intermediate in the right-to-left direction of the cassette housing 1 and near the front of the cassette housing 1 and has a depth of substantially 0.5 mm. The bottom wall and the front wall of the contoured engagement portion 10 (i.e., the horizontal wall and the vertical wall on the side of the engagement portion 10 that is nearest the front of the tape cassette) are planar and defined a right dihedral angle DA, best shown in FIG. 4.

Figure 3:
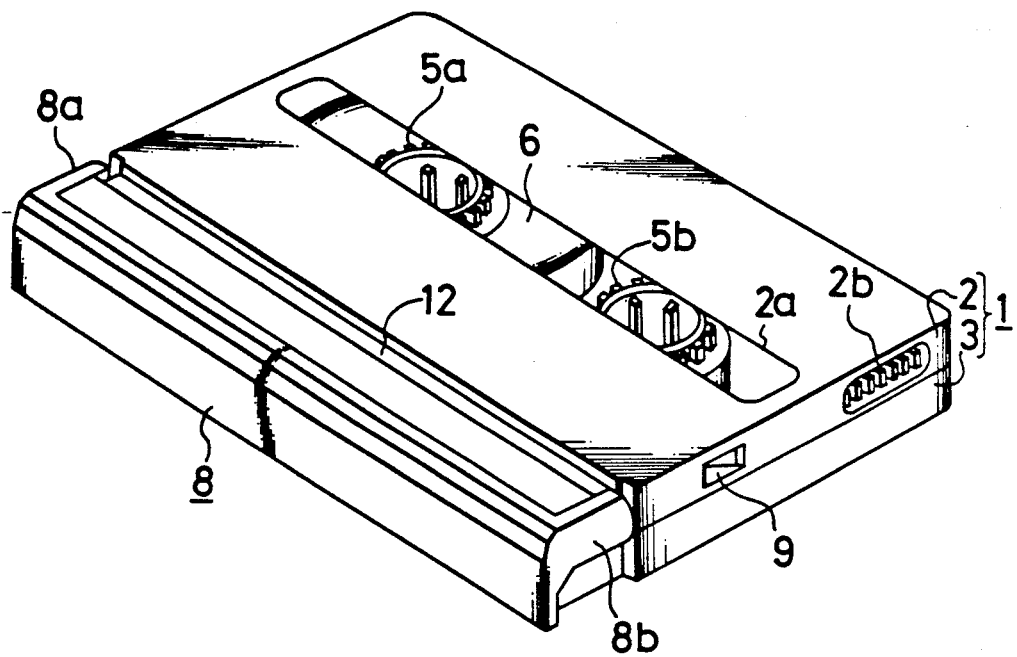
FIG. 3 is a perspective view from above of another embodiment of a tape cassette in accordance with the invention, the cassette being shown in a closed condition.

FIG. 3 illustrates another embodiment of the tape cassette according to the invention. In this embodiment, on the upper surface of the upper section 2 of the cassette housing 1, the contoured engagement portion takes the form of an elongated groove 12 which is parallel to the front of the cassette housing 1 and to the front lid 8. Other reference numerals designate the same elements and parts as those of FIGS. 1 and 2 and are not described in detail. In particular, the bottom and the front walls are planar and define a right dihedral angle DA, as in FIG. 4.

Figure 4:
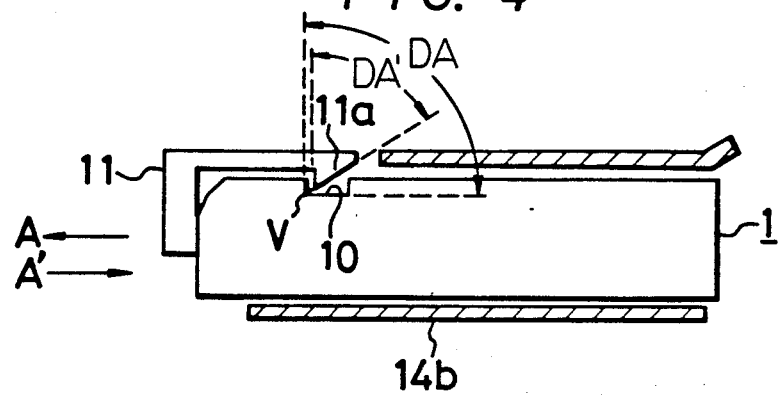
FIG. 4 is a diagram in side elevation, partly in section, illustrating the loading of the tape cassette of FIG. 1 or 3 into recording/reproducing apparatus constructed in accordance with the invention.

As FIG. 4 further shows, a cassette introducing or loading member 11 of substantially L-shape in cross section is provided in a tape player constructed in accordance with the invention. The cassette loading member 11 is at a location that is intermediate the right and left sides of the cassette housing 1. The cassette loading member 11 has an end formed with a loading hook 11a and is slidable back and forth along a direction parallel to the loading and ejection directions of the tape cassette, as respectively indicated by arrows A and A' in FIG. 4.

When a tape cassette according to the invention is inserted a predetermined distance into a cassette holder 14b of the recording and/or reproducing apparatus, the loading hood 11a of the cassette loading member 11 becomes engaged in the grooved engagement portion 10 of the cassette housing 1 as shown in FIG. 4, or in the groove 12 (embodiment of FIG. 3). Under this state, when the tape cassette is given a slight push (as explained below) in the loading direction indicated by the arrow A, a motor 16 (FIG. 5) is actuated a disclosed below and, by means of an arrangement of cams and levers, moves the cassette loading member 11 further in the direction shown by the arrow A until it arrives at the loaded position. Since the loading hook 11a is integral with the cassette loading member 11 and is engaged in the concave portion 10 or 12, the tape cassette is drawn into the cassette holder 14b to a predetermined loaded position. Thereafter, the cassette holder 14b is moved downwards (FIG. 5) and reel shafts are inserted into the reel shaft insertion apertures 4a and 4b formed in the lower section 3. Thus the tape cassette is mounted on the reel base at its tape drive position.

Figure 5:
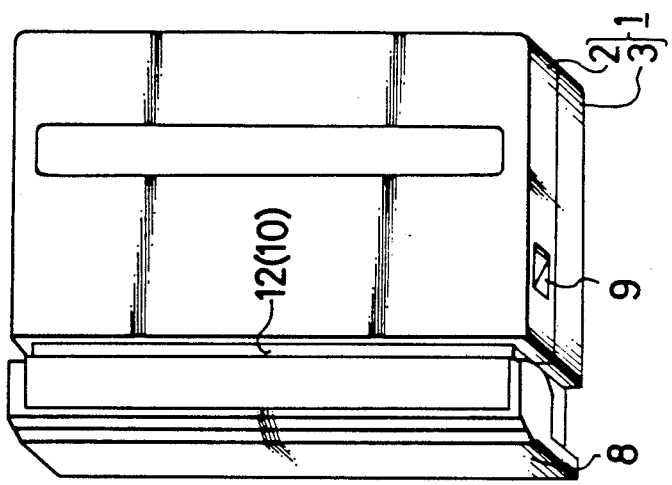
FIG. 5 is a perspective view from above of a preferred embodiment of recording and/or reproducing apparatus in accordance with the invention and including a cassette loading mechanism adapted for cooperation with the tape cassette of the invention.
Figure 5:
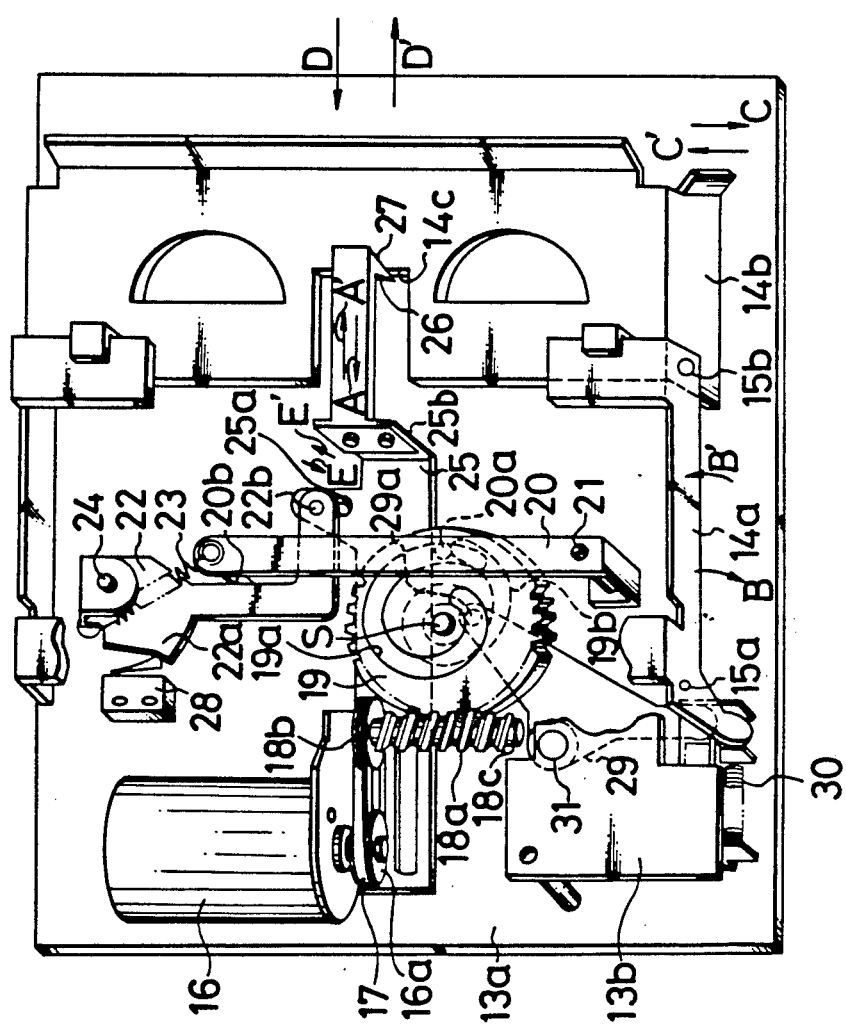
Figure 6:
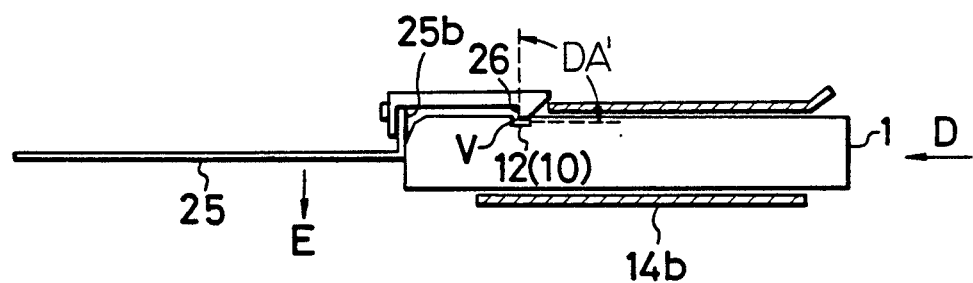
FIGS. 6 and 7 are diagrams in side elevation, partly in section, illustrating certain aspects of the cooperation between the tape cassette and the recording/reproducing apparatus of the invention.
Figure 7:
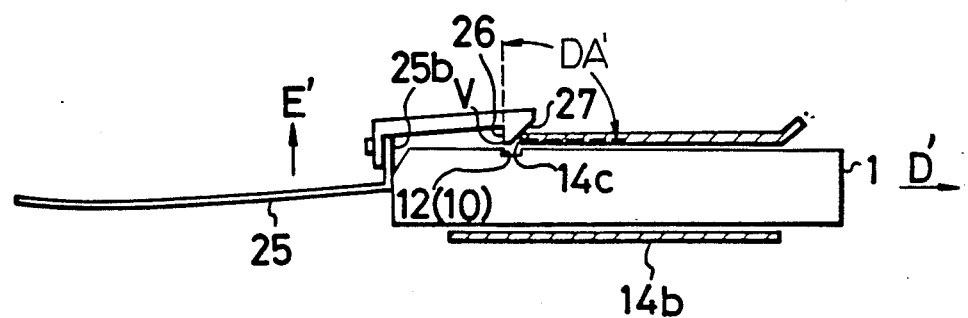

FIGS. 5 to 7 show a preferred embodiment of a recording and/or reproducing apparatus constructed in accordance the the invention and adapted to cooperate with the tape cassette of FIG. 1 or 3. In FIG. 5, a main base plate 13a supports the usual reel shaft drive apparatus, recording and reproducing heads, etc. (not shown). An auxiliary plate 13b is attached to the main base plate 13a and spaced apart therefrom by a predetermined distance.

A cassette holder 14b is attached to the auxiliary plate 13b through an elevating arm 14a of substantially L-shape. The cassette holder 14b is adapted to hold a tape cassette 1, shown at the right of FIG. 5. The elevating arm 14a is supported by a horizontal pivot shaft 15a, whereby the elevating arm 14a is rotatable relative to the auxiliary plate 13b. The elevating arm 14a has a portion that extends from the shaft 15a forwardly (i.e., in the direction of the arrow D') towards the cassette holder 14b and that is connected to the cassette holder 14b by a coupling hinge 15b. Accordingly, when the elevating arm 14a is rotated around the horizontal pivot shaft 15a (in directions shown by arrows B and B'), the cassette holder 14b is moved down and up (as shown by arrows C and C') in a direction substantially perpendicular to the plane of the main base plate 13a. The cassette holder 14b is moved by the elevating arm 14a between a load/eject position, wherein a tape cassette can be loaded into or ejected from the cassette holder 14b, and a tape driver position, wherein a cassette loaded into the holder engages tape drive means, whereby a recording and/or reproducing operation can be performed.

A cam will 14c (FIGS. 5 and 7) facilitating disengagement of the loading hook 26 from the engagement portion 10 or 12 as described below is formed by cutting out the upper surface of the cassette holder 14b in an area above the engagement portion 10 or 12 of a tape cassette that is held therein.

Through an arrangement of cams and levers described below, the loading motor 16 powers both the movement of the loading means (11, 11a in FIG. 4; 25, 25b, 26, 27 in FIGS. 5-7) between the ejection position wherein a tape cassette can be manually inserted partway into or removed from the cassette holder 14b and the loaded position wherein an inserted cassette is fully drawn into the holder 14b, and the movement of the cassette holder 14b between a load/eject position wherein a cassette can be loaded into or ejected from the holder 14b and a tape drive position wherein a cassette loaded into the holder 14b engages tape drive means whereby a recording and/or reproducing operation can be performed. The loading motor 16 is mounted on the auxiliary plate 13b and rotates in one direction, which may be considered the "positive" direction, in order to move the tape cassette in the direction of the arrow A and in the reverse direction in order to move the tape cassette in the direction of the arrow A'. In order to load the cassette, it is moved in the direction A; and in order to eject the cassette, it is moved in the direction A'. A motor pulley 16a is attached to the drive shaft of the loading motor 16, and the motor pulley 16a is connected through a belt 17 to a pulley 18b fixed on a rotary shaft 18c. A worm gear 18a is formed on the same rotary shaft 18c.

A worm wheel 19 is freely rotatable about a vertical shaft S mounted on the auxiliary plate 13b and meshes with the worm gear 18a. The worm wheel 19 is formed with two spiral cams 19a and 19b, the former of which controls the horizontal load/eject movements of the cassette and the latter of which controls the vertical movement of the cassette holder 14b.

The first grooved cam 19a formed on the upper surface of the worm wheel 19 has a shape that spirals radially outwardly in the clockwise direction as viewed from above. When the loading motor 16 is rotated in the loading direction, i.e. in the direction that causes the cassette to move in the direction A, the worm wheel 19 as viewed in FIG. 5 is rotated clockwise. The first grooved cam 19a engages a cam follower in the form of a pin 20a that extends from an intermediate position along the lower surface of a conversion lever 20. The lever 20 is elongated and pivoted near one end on the auxiliary plate 13b about a vertical pivot shaft 21. A pin 20b extends from the lower surface of the lever 20 near the free end thereof opposite the shaft 21. The pin 20b engages a lever 22 of substantially L-shape. The lever 22 is pivoted about a vertical shaft 24, and a coil tension spring 23 is stretched between the free end of the lever 20 and the lever 22 in such a manner as to maintain the pin 20b and the lever 22 in abutting relation.

The lever 22 is substantially L-shaped, and a convex switch-actuating portion 22a is formed thereon adjacent to a limit switch 28. A pin 22b extends from the lower surface of the lever 22 near its free end opposite the pivot shaft 24. The pin 22b of the lever 22 is inserted into a slot 25a formed in the loading arm 25. The loading arm 25 has the form of a leaf spring that is resilient at least in the up-and-down direction (shown by arrows E and E') to facilitate engagement with a cassette inserted in the holder 14b (see also FIGS. 6 and 7). The contact wall 25b is provided by bending a part of the loading arm 25 upwards at a right angle, and the loading arm 25 is attached to the auxiliary plate 13b at a position intermediate the edges of the plate 13b, such intermediate position being determined with respect to a direction that is parallel to the plane of the plate 13b and perpendicular to the load/eject direction of movement of the tape cassette. The loading arm is slidable back and forth in the load/eject direction of movement of the tape cassette.

A loading hook 11a (FIG. 4) or 26 (FIGS. 5-7) is provided near the end of the loading arm 11 or 25 nearest the cassette holder 14b. The loading hook 11a or 26 projects downwardly from the lower surface of the loading member so that it is engageable in the engagement portion 10 or 12 of the tape cassette that is inserted into the cassette holder 14b. The loading hook 11a or 26 has outer planar surfaces defining a dihedral angle DA; that does not exceed a right angle (FIGS. 4-7) and preferably is acute (FIGS. 4 and 5). A portion of the hook in the vicinity of the vertex B of the angle DA' is engageable with the concave engagement portion 10 or 12. Because of the structure of the engagement portion 10 or 12 and the loading hook 11a or 26, the engagement between the two is positive and secure, even if the depth of such engagement portion is as little as 0.5 mm. Nevertheless, the hook 11a or 26 and engagement portion 10 or 12 can be readily disengaged to enable movement of the cassette holder 14b to the tape drive position or withdrawal of the tape cassette from the tape holder 14b.

The loading hook 26 is formed with a forward surface 27 that slopes up and to the right (FIG. 7). When the loading hook 26 is engaged in the engagement portion 10 or 12, the sloping surface 27 is opposed to the cam wall 14c of the cassette holder 14b. Upon withdrawal of the cassette in the direction of the arrow D', the camming action between the surfaces 27 and 14c disengages the hook 26 from the engagement portion 10 or 12.

Before the tape cassette is loaded into the magnetic recording and/or reproducing apparatus, the pin 20a of the lever 20 is positioned near the outermost radial portion (clockwise end) of the first grooved cam 19a, the loading arm 11 or 25 is moved to the loading start or ejection position (right-hand position in FIG. 5) by the coil spring 23 and the lever 22, and the loading motor 16 is turned off by the limit switch 28. When the tape cassette is passed through the cassette entrance opening (not shown) formed on the front of the magnetic recording and/or reproducing apparatus and inserted a predetermined distance into the cassette holder 14b (as indicated by an arrow D), the loading hook 11a or 26 enters the engagement portion 10 or 12 of the tape cassette by virtue of the resilient force of the loading arm 25 acting in the downward direction (shown by the arrow E in FIG. 6). When the tape cassette is pushed further in the direction of the arrow D, as by a light manual pressure, so as to bear against the wall 25b of the loading arm 25, the lever 22, which is connected to the loading arm 25 via the pin 22b and the slot 25a, is rotated sufficiently to engage the limit switch 28 by means of the convex portion 22a. This turns on the loading motor 16 so as to rotate the motor in the positive direction. Thus, the automatic loading of the tape cassette in the loading direction (shown by an arrow A) is commenced, and the tape cassette is fully drawn into the cassette holder 14b to a predetermined loaded position. The cam 19a spirals radially inwardly over a first portion of its length near its clockwise end and is at a constant radial distance from the cam axis S over a second portion of its length near its counterclockwise end. The cassette reaches the loaded position as the cam follower reaches the second portion of the cam 19a.

The second grooved cam 19b is formed on the lower surface of the worm wheel 19. The cam 19b is formed in a spiral that is complemental to that of the first spiral cam 19a. That is, whereas clockwise motion of the first cam 19a causes its cam follower 20a to move from right to left in FIG. 5, clockwise motion of the second cam 19b (again as viewed in FIG. 5) causes its cam follower 29a to move from left to right in FIG. 5. The second cam 20a is at a constant radial distance from the cam axis S over a first portion of its length defining a loading range near its clockwise end and spirals radially outwardly over a second portion of its length near its counterclockwise end. The second grooved cam 19b is engaged by a pin 29a that projects as a cam follower from a first corner upper surface of an elevator lever 29 of substantially triangular shape. A second corner portion of the elevator lever 29 is coupled to the other end of the elevator arm 14a through a limiter 30 serving a clamping function, and a third corner portion of the elevator lever 29 in a position intermediate between the first and second corner portions is rotatably pivoted on the auxiliary plate 13b by a vertical pivot shaft 31. The loading motor 16 is rotated in the positive direction so as to rotate the worm wheel 19 clockwise (FIG. 5).

When the pin 29a of the elevator arm 29 is in the radially inner portion of the spiral of the second grooved cam 19b, the cassette holder 14b is at the same height as the cassette entrance opening (not shown) in the tape player housing. When, on the other hand, the cam follower pin 29a of the elevator lever 29 moves radially outward with respect to the rotational axis of the worm wheel 19 as the cam follower pin 29a tracks along in the spiral groove of the cam 19b, the cassette holder 14b is moved downward to the tape drive position (as shown by the arrow C) by means of the limiter 30 and the elevator arm 14a.

Within the loading range of the second grooved cam 19b, rotation of the cam 19 does not cause rotation of the elevator lever 29. While the cam follower 29a is in this loading range, the cassette holder 14b is held at the load/eject position, which is at the same height as the cassette entrance opening. Beyond the loading range of the cam groove 19b is an elevator range. Within the elevator range, continued rotation of the cam 19 in the same direction rotates the elevator lever 29 so as to move the cassette holder 14b downwards to the tape drive position. Conversely, rotation of the cam 19 in the opposite direction in the elevator range elevated the cassette holder 14b to the load/eject position. In a complemental way, the first grooved cam 19a defines a loading range in which the conversion lever 20 is rotated so as to move the loading arm 25 from the ejection position to the loaded position and an elevator range in which rotation of the cam 19a does not cause rotation of the lever 20. While the cam 19a is in the elevator range, the loading arm 25 is held at the loaded position. Other portions of the recording and/or reproducing apparatus such as a signal recording and reproducing system and so on are formed similarly to those of the prior art recording and/or reproducing apparatus.

When a tape cassette is introduced into the cassette entrance opening (not shown) at the front of the recording/reproducing apparatus and moved in the direction shown by the arrow D to the load/eject position, the loading hook 26 enters the engagement portion 10 or 12 of the cassette housing 1. The contact wall 25b of the loading arm 25 can then be pushed in the direction shown by the arrow A by a slight pressure exerted manually on the tape cassette. The lever 22 is rotated by the pushing force, and the loading motor 16 is turned on by the limit switch 28. When the loading motor 16 is turned on and rotated in the positive direction, the worm wheel 19 is rotated clockwise, the conversion lever 20 is rotated in accordance with the loading range defined by the first grooved cam 19a, and the loading arm 25 is horizontally slide along the loading direction A by means of the pin 20b and the lever 22. Since the loading hook 26 is engaged within the engagement portion 10 or 12, the tape cassette is drawn by the loading hook to the loaded position. By virtue of the dihedral angle DA' formed by the outer planar surfaces of the loading hook, and the dihedral angle DA formed by the bottom and front wall of the concave engagement portion 10 or 12, the loading hook 11a or 26 positively engages the engagement portion 10 or 12 even if the depth of the engagement portion is as little as 0.5 mm. During this loading period, the elevator lever 29 is not rotated, and the cassette holder 14b is held at the load/eject position, which has the same elevation as the cassette entrance opening.

When the loading operation is ended, the pin 20a of the lever 20 moves from the loading range of the first grooved cam 19a to the elevator range and the pin 29a of the elevator lever 29 moves from the loading range of the second grooved cam 19b to the elevator range. Then, the loading arm 25 becomes stationary and the elevator lever 29 rotates in response to movement of the second grooved cam 19b. As the elevator lever 29 rotates, the limiter 30 is actuated, and the elevator arm 14a is rotated by the limiter 30 so a to lower the cassette holder 14b (as shown by the arrow C) to the tape drive position. By virtue of the dihedral angle DA' formed by the outer planar surfaces of the loading hook and the dihedral angle DA formed by the bottom and front wall of the concave engagement portion 10 or 12, the loading hook 11a or 26 easily becomes disengaged from the engagement portion 10 or 12. In the tape drive position, reel shafts (not shown) are respectively inserted into the reel shaft insertion apertures 4a and 4b formed in the lower section 3 of the cassette housing 1, and the tape extracting guide assembly or the like (not shown) is inserted into the cutout portion 3a. Further, when the cassette holder 14b is moved downwards (or upwards), the front lid 8 of the tape cassette is opened (or closed) by the lid opening and closing mechanism (not shown).

In order to unload and eject the tape cassette, an eject button (not shown) is depressed. This causes the loading motor 16 to rotate in the reverse direction so that the worm wheel 19 is rotated in the reverse direction (counterclockwise in FIG. 5). Within the elevator range of the cam 19b, this rotation of the worm wheel 19 rotates the elevator lever 29. In response to the rotation of the elevator lever 29, the limiter 30 is actuated so that the elevator arm 14a is rotated by the limiter 30 and the cassette holder 14b is moved upwards from the tape drive position to the load/eject position, which is at the same height as the cassette entrance opening. At this time, the loading hook 11a or 26 is once again engaged with the engagement portion 10 or 12 of the cassette housing 1.

As the cassette holder 14b completes its upward movement (in the direction shown by the arrow C') to the load/eject position, the pin 29a of the elevating lever 29 and the pin 20a of the conversion lever 20 are moved from the elevator ranges of the second grooved cam 19b and first grooved cam 19a to the respective load/eject ranges. The cassette holder 14b stops at the load/eject position. In response to continued rotation of the worm wheel 19 through the load/eject range, the first grooved cam 19a, acting through the cam follower pin 20a, conversion lever 20, coil spring 23, pin 20b, lever 22, pin 22b and slot 25a, causes the loading arm 25 to slide in the removal or ejection direction (shown by the arrow A'). Thus the tape cassette held within the cassette holder 14b is moved by the contact wall 25b to the ejection position, in which the cassette is exposed for manual removal. When the tape cassette is then manually pulled in the direction shown by the arrow D', the loading hook 11a or 26 engaged within the concave engagement portion 10 or 12 of the cassette housing 1 is pulled in the same direction by the tape cassette. This force moves the loading arm 25 farther in the same direction to a point beyond (to the right of) the loading-start position. As a result, the sloped portion 27 of the loading arm 25 engages the cam wall 14c of the cassette holder 14b. As FIG. 7 shows, the loading arm 25 is flexible so that it deforms or bends in the upward direction (shown by the arrow E') as the sloped portion 27 moves against the wall 14c. This elevates the sloped portion 27 and breaks the engagement between the loading hook 26 and the concave engagement portion 10 or 12. The tape cassette can thus be removed from the magnetic recording and reproducing apparatus smoothly and easily.

Thus there is provided in a accordance with the invention a novel and highly-effective tape cassette of simple construction that is easily, reliably and efficiently loaded into magnetic recording and/or reproducing apparatus, and novel and highly-effective apparatus that is reliably and efficiently engaged with and disengaged from a tape cassette constructed in accordance with the invention.

Many modifications of the preferred embodiments of the invention disclosed herein will readily occur to those skilled in the art upon consideration of this disclosure. For example, instead of beveling the surface 27, it is possible to bevel the surface 14c in order to provide a camming action that flexes the loading arm 25 as shown in FIG. 7. Moreover, the height of the engagment portion 10 or 12, its position on the upper section 2 of the cassette housing 1, the precise shape of the loading hook 26, and the arrangement of cams and levers for effecting the required movements of the cassette housing 1 and cassette holder 14b can be varied within wide limits within the spirit and scope of the invention. Accordingly, the invention is to be construed as including all structure that falls within the scope of the appended claims.

We claim as our invention:

1. A tape cassette comprising:
   a cassette housing having an upper section and a lower section;
   a pair of reel hubs for winding therearound a magnetic tape, said hubs being rotatably accommodated in said cassette housing;
   said lower section being formed with a pair of openings for respectively receiving a pair of reel shafts for rotating said hubs and thereby driving said tape;
   said housing being formed with a front opening through which said tape is engageable with a recording and/or reproducing head;
   front lid means pivotally supported at opposite, left and right sides of said cassette housing and movable between a closed position wherein it covers said front opening and an open position wherein it uncovers said front openings;
   said upper section having an upper surface formed with an engagement portion which is integral and immovable with respect to said supper section and separate from said front lid means and comprises a rectangular groove formed in said upper section at a position intermediate in a left-to-right direction of said cassette housing and adjacent to said front opening, said groove being formed with a planar bottom wall and a planar front wall defining a right dihedral angle, said planar front wall extending to said upper surface of said upper section, and said front wall of said groove being selectively engageable with and disengageable from loading means formed on recording and/or reproducing apparatus when said cassette housing is loaded into said apparatus, whereby said loading means can move said cassette housing within said apparatus in a direction substantially perpendicular to said front wall.

2. A tape cassette according to claim 1; wherein said upper section comprises a transparent window plate and said groove is between said transparent transparent window plate and said front opening on said upper section.

3. A tape cassette according to claim 1; wherein said engagement portion has a vertical height of substantially 0.5. mm.

* * * * *

UNITED STATES PATENT AND TRADEMARK OFFICE
CERTIFICATE OF CORRECTION

PATENT NO. : 4,816,953
DATED : March 28, 1989
INVENTOR(S) : Masao Ohyama et al.

It is certified that error appears in the above-identified patent and that said Letters Patent is hereby corrected as shown below:

```
Column 1, line 61, change "aperture" to --apertures--.
Column 3, line 18, change "sections" to --section--;
          line 19, change "an" to --any--;
          line 30, after "that" insert --the--.
Column 4, line 18, change "defined" to --define--.
Column 5, line 27, change "will" to --wall--;
          line 65, change "movement" to --movements--.
Column 6, line 44, change "DA;" to --DA'--.
          line 47, change "B" to --V--.
Column 8, line 12, change "elevated" to --elevates--;
          line 40, change "slide" to --slid--;
          line 64, change "a" to --as--.
Column 9, line 61, delete "a".
Column 10, line 10, change "engagment" to -- engagement--.
```

UNITED STATES PATENT AND TRADEMARK OFFICE
CERTIFICATE OF CORRECTION

PATENT NO. : 4,816,953

DATED : March 28, 1989

INVENTOR(S) : Masao Ohyama et al.

It is certified that error appears in the above-identified patent and that said Letters Patent is hereby corrected as shown below:

IN CLAIMS:

Column 10, line 37, change "openings" to --opening--.

line 40, change "supper" to --upper--.

Signed and Sealed this

Ninth Day of January, 1990

*Attest:*

JEFFREY M. SAMUELS

*Attesting Officer*  Acting Commissioner of Patents and Trademarks